United States Patent [19]

Jacks

[11] 4,014,516
[45] Mar. 29, 1977

[54] SPAN TROLLEY

[76] Inventor: Kenneth R. Jacks, 2117 Ruby, Irving, Tex. 75060

[22] Filed: May 6, 1976

[21] Appl. No.: 683,731

[52] U.S. Cl. .......................................... 254/134.5
[51] Int. Cl.² ...................................... H02G 1/02
[58] Field of Search .......... 254/134.3 R, 134.3 CL, 254/134.3 PA, 134.5

[56] References Cited
UNITED STATES PATENTS

| 628,994 | 7/1899 | Schottle et al. | 254/134.5 |
| 1,569,521 | 1/1926 | Milton | 254/134.5 |
| 2,604,521 | 7/1952 | Boucher | 254/134.5 |

Primary Examiner—Al Lawrence Smith
Assistant Examiner—Robert C. Watson
Attorney, Agent, or Firm—Howard E. Moore; Gerald G. Crutsinger

[57] ABSTRACT

A span trolley detachably connectable to a line suspended between first and second poles to draw an end of a cord from the first pole to the second pole. Two guide wheels and a drive wheel, secured to a chassis, are resiliently urged into engagement with the line extending between the poles. The chassis is moved along the line by a reversible variable speed electric motor to draw a cord having an end connected to the chassis along the line. The resiliently mounted guide wheels are adapted to move transversely relative to the line such that the span trolley passes splices and other obstructions along the line and maintains the drive wheel in driving engagement with the surface of the line while obstructions are being traversed.

10 Claims, 9 Drawing Figures

SPAN TROLLEY

BACKGROUND OF THE INVENTION

In adding or replacing suspended cables, such as electric, telephone, steel or other cables, a non-conductive cord is usually positioned over the top of a first pole or other point of suspension, moved along the ground to a second point of suspension, and positioned over the second point of suspension. The non-conductive cord is then attached to the end of the cable to draw the cable between the fixed points of suspension. When fixed to the elevated points of suspension, the cable forms a catenary curve.

Problems have been encountered when the wire must be suspended over natural or man-made obstacles such as highways, rivers and valleys.

To suspend a cable across a highway, heretofore, traffic has been interrupted as the non-conductive cord was drawn from the first point of suspension on one side of the highway to the second point of suspension on the other side of the highway. This created a hazardous condition for both the vehicles on the highway and the workmen who move the non-conductive cable across the highway. In addition, natural obstacles often pose an even greater problem; for example, a boat must be used to trasverse a river.

It should be noted that the above procedure has been employed even if at least one cable is already in position between the points of suspension.

Heretofore devices have been devised to move along electrical conductors to string a second conductor parallel to the first conductor. Such devices are disclosed in U.S. Pat. Nos. 628,994; 695,504; 798,602; and 1,569,521.

Devices of the type described in the aforementioned patents have not enjoyed commercial success for stringing new cable or for re-wiring to replace damaged cable.

The devices heretofore devised were not adapted to move along strands of wire of different diameters and particularly were not adapted to pass obstacles, such as splices which are often encountered. Further, the devices were not equipped with a power source suitable for propelling the device along a long span of wire. The particular sources of power, such as spring powered drive wheels, immediately expend all of the power in the spring if the drive wheel becomes momentarily moved out of engagement with the cable along which the device is travelling.

Telephone cables often comprise a bundle of conductors about which a strand of wire is spirally wrapped such that the surface of the cable has an irregular surface. Splices in electrical conductors generally comprise a tubular sleeve which is cramped onto ends of conductors to connect the conductors together. A splice for copper wire might comprise a sleeve which is ⅜ of an inch in diameter and 4 inches long while a splice for larger aluminum conductors may comprise a sleeve which is 2 inches in diameter and 36 inches long.

The prior devices referred to above were not capable of moving along strands of wire of different diameters and particularly along a strand of wire which changes diameters intermediate points of suspension of the wire.

SUMMARY OF INVENTION

I have devised a span trolley particularly adapted to move along a flexible cable hanging freely between two fixed points for positioning a pull-cord or another cable between the fixed points.

The span trolley comprises a driven wheel which is maintained in engagement with the upper surface of the cable and supports the weight of the span trolley. Two guide wheels are spring-urged into engagement with the lower surface of the cable to assure that the driven wheel is maintained in frictional engagement with the cable at all times.

The chassis of the span trolley comprises an angle-shaped mounting bracket to which an electric motor and the driven wheel are secured, the electric motor being drivingly connected to the drive wheel. The electric motor is powered by a wet cell battery which is preferably secured to the lower portion of a carrier hingedly connected to the chassis of the span trolley.

The electric motor is preferably a reversible variable speed motor and is remotely controlled, for example, by a radio frequency generating device such that the span trolley can be stopped, reversed and started to facilitate moving the trolley through branches of trees adjacent a cable.

The guide wheels are secured to opposite ends of a leaf-spring, the central portion of which is secured to the chassis of the span trolley, such that the leaf spring permits independent movement of each of the guide wheels relative to each other and relative to the drive wheel.

A primary object of the invention is to provide a span trolley which is detachably connectable to a line suspended between two fixed points, the span trolley being particularly adapted to travel along lines of different diameters and along lines the diameter of which vary intermediate points of suspension.

Another object of the invention is to provide a span trolley particularly adapted to move along a catenary curve, the curvature of the line varying along the length of the line.

A further object of the invention is to provide a span trolley having independently spring-urged guide wheels adapted to negotiate splices and other obstructions on the surface of a line along which the span trolley travels.

A still further object of the invention is to provide a span trolley having a remotely controlled electric motor, the remote control device comprising a sound transmitting apparatus such that it is not necessary for the span trolley to draw a control wire across the span.

Other and further objects of the invention will become apparent upon referring to the detailed description hereinafter following and to the drawings annexed hereto.

DESCRIPTION OF THE DRAWINGS

Drawings of a preferred embodiment of the invention are annexed hereto so that the invention may be better and more fully understood, in which.

Numeral references are employed to designate parts throughout the drawing and like numerals designate like parts throughout the various figures of the drawing.

DESCRIPTION OF A PREFERRED EMBODIMENT

Figure 1:
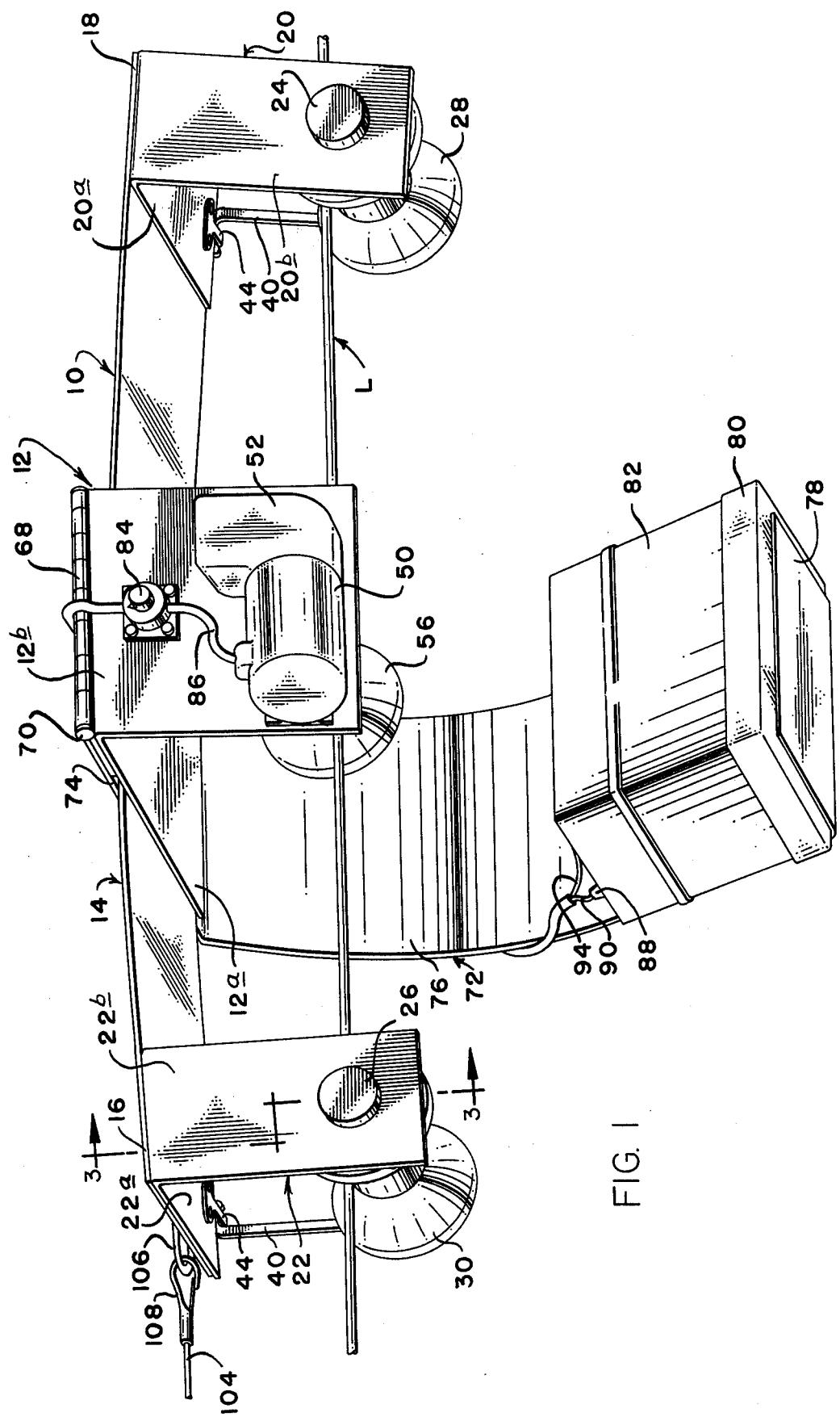
FIG. 1 is a perspective view of the span trolley.

Referring to FIG. 1 of the drawing, the numeral 10 generally designates a span trolley or carrier which is preferably constructed of non-conductive material such as plastic or rubber to prevent accidental conduction of electricity if the carrier is used in the vicinity of charged electrical conductors.

As will be hereinafter more fully explained, carrier 10 generally comprises a chassis 12, a pair of guide wheels 28 and 30 secured to a leaf spring 14 and a driven wheel 56. As illustrated in FIG. 1, line L has opposite ends secured to any suitable suspension means, such as a cross bar on a utility pole. Guide wheels 28 and 30 engage the lower surface of line L while the weight of the carrier 10 is supported by driven wheel 56 which engages the upper surface of line L.

Figure 3:
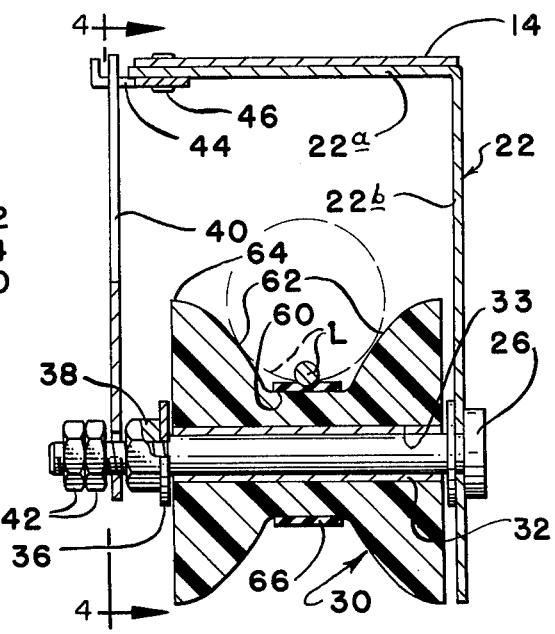
FIG. 3 is a cross-sectional view taken along line 3—3 of FIG. 1.

Referring to FIGS. 1 and 3 of the drawing, chassis 12 comprises an angle member having a substantially horizontally disposed upper flange 12a and a substantially vertically disposed downwardly extending flange 12b.

Leaf spring 14 preferably comprises a substantially rectangular elongated resilient member, the central portion of which is secured in overlying relation to the upper flange 12a of chassis 12 such that ends 16 and 18 of spring 14 extend outwardly from opposite sides of chassis 12. It should be appreciated that the segments of spring 14 form resilient cantilever beams, guide rollers 28 and 30 being secured to free ends thereof.

Spring 14 is preferably constructed of a material which is not a conductor of electricity. However, a prototype of the device illustrated in FIG. 1 of the drawing was constructed utilizing a tempered steel hand-saw blade. The resilience of the steel spring allows rollers 28 and 30 to move independently of each other and independently of drive wheel 56. The steel spring also was capable of carrying torsional loading to permit twisting of guide wheels 28 and 30 to a position wherein axes thereof were not in alignment with the axis of drive wheel 56 which facilitated attachment of the carrier 10 to a line L of relatively large diameter.

Each mounting bracket 20 and 22 comprises an angle member rigidly secured to ends 16 and 18 of spring 14 having horizontally disposed upper flanges 20a and 22a and vertically disposed downwardly extending flanges 20b and 22b. As best illustrated in FIGS. 1 and 3, threaded axles 24 and 26 extend through passages formed in the downwardly extending legs 20b and 22b, respectively, of mounting brackets 20 and 22 and are rigidly secured to flanges 20b and 22b.

A bushing 32 is positioned in a central passage 33 formed through each wheel 28 and 30. Each bushing 32 and wheel are rotatably secured to axles 24 and 26. Washers 34 and 36 are positioned on axles 24 and 26 on opposite sides of guide wheels 28 and 30 to prevent wear of the mounting brackets 20 and 22 and facilitate rotation of the guide wheels 28 and 30. Retaining nuts 38 are threadedly secured to axles 24 and 26 to retain the guide wheels 28 and 30 thereon.

Figure 4:
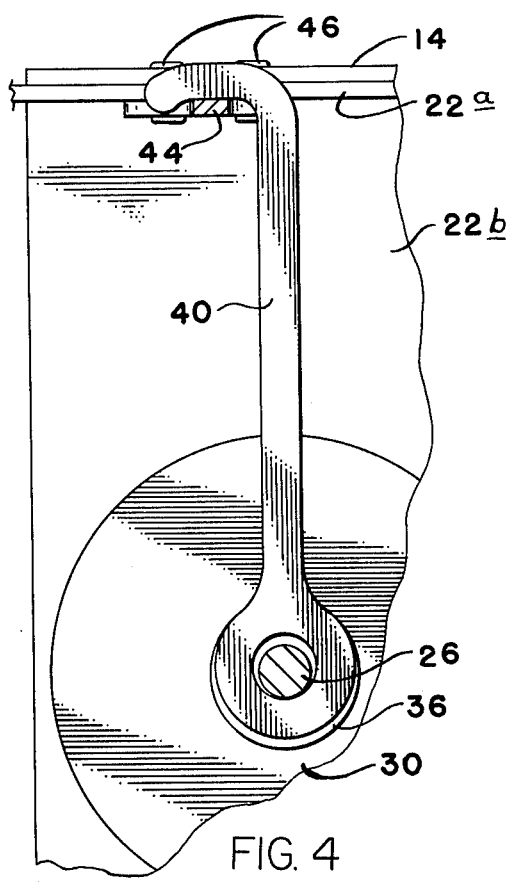
FIG. 4 is a cross-sectional view taken along line 4—4 of FIG. 3.
Figure 5:
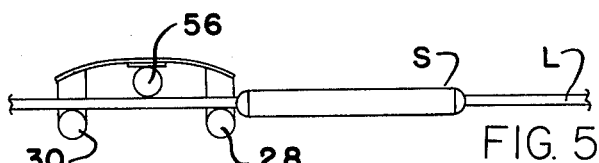
FIGS. 5-8 are diagrammatic views illustrating the independent movement of the guide wheels and the drive wheel as the span trolley moves onto and across a splice in a line.

Retaining hooks 40 are rotatably secured to axles 24 and 26 on the outward side of nuts 38 and retained thereby by lock nuts 42. As best illustrated in FIG. 4, the retaining hook 40 is adapted to engage a spring clip 44 which is rigidly secured to mounting brackets 20 and 22 and leaf spring 14 by rivets 46.

It should be readily apparent that hooks 40 prevent accidental disengagement of guide wheels 28 and 30 from line L.

A drive means such as a reversible variable speed, electric motor 50 is secured to flange 12b of chassis 12. Gear box 52 is drivingly connected to motor 50. Drive axis 54 extends outwardly from gear box 52 and extends below leaf spring 14 through a passage formed in chassis 12.

Driven wheel 56 is rigidly secured to drive axle 54 by means of nut 58 threadedly secured to the end of drive axle 54. The driven wheel 56 preferably is positioned above line L such that weight of the carrier 10 adds additional frictional force to facilitate movement of the carrier along the line L.

The longitudinal axes of axles 24 and 26 are generally parallel to the transverse axis of the carrier 10 when in an unloaded condition.

The support means or leaf spring 14 is adapted to permit torsional movement of the spring 14 about the longitudinal axis of the carrier 10 moving the axis of axles 24 and 26 out of parallel relation relative to the transverse axis of the carrier. This allows movement of the guide wheels 28 and 30 vertically and horizontally relative to the driven wheel 56 to facilitate positioning driven wheel 56 above line L and guide wheels 28 and 30 below line L. It should further be appreciated that each end 16 and 18 of spring 14 may be rotated about the longitudinal axis of spring 14 independently of the other end.

The torsional movement further facilitates movement of the carrier 10 over a splice S as more fully explained hereinafter.

It should be readily apparent from the foregoing that rotation of driven wheel 56 propels the carrier 10 along line L.

As best illustrated in FIG. 3, the driven wheel 56 and guide wheels 28 and 30 have a circumferentially extending groove 60 formed in the periphery thereof. Groove 60 is defined by converging curved intermediate surfaces 62 such that a concave curve is formed between groove 60 and the outer rims 64. Groove 60 has a friction surface 66 such as a rubber band secured thereto to increase traction of the driven wheel 56 and guide wheels 28 and 30 on line L.

It should be appreciated that cables of varying size are easily accommodated by the rollers 28, 30 and 56 with maximum traction thereon, as best illustrated by the cables in dashed outline in FIG. 3. It should be appreciated that a cable or line L of larger diameter will contact the intermediate surfaces 62 of the wheels to provide contact on the side of the line L as well. This enables the device to move over lines L and splice S or other joints of varying sizes.

The grooves 60 on each of the wheels are positioned such that the longitudinal axis of line L passes above wheel 28, below wheel 56, and above wheel 30.

Figure 2:
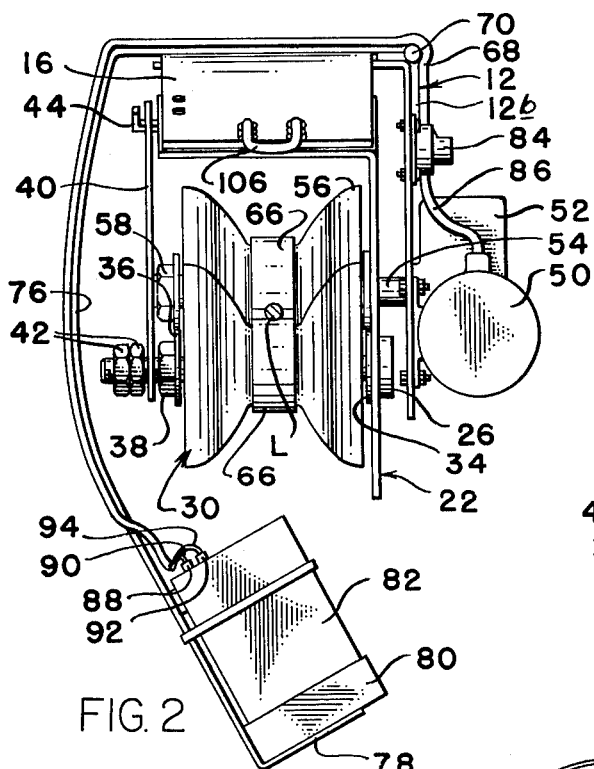
FIG. 2 is an end elevational view thereof.

As best illustrated in FIGS. 1 and 2, a battery holder arm 72 is pivotally secured to the upper portion 12a of chassis 12 by hinge 68 and pin 70. Battery holder arm 72 has a first horizontally extending flange 74 which extends over chassis 12a and leaf spring 14. A central section 76 of arm 72 extends downwardly and curves under carrier 10. A base 80 is rigidly secured to horizontally extending flange 78 of arm 72 to support the battery 82.

The battery 82 is preferably rechargeable such as a 12 volt DC wet cell battery; however, any type of battery capable of deliverying a long sustained amount of power would be suitable. The battery holder arm 72 is pivotally moved upwardly to allow mounting the carrier 10 on line L as will be more fully explained hereinafter.

Figure 9:
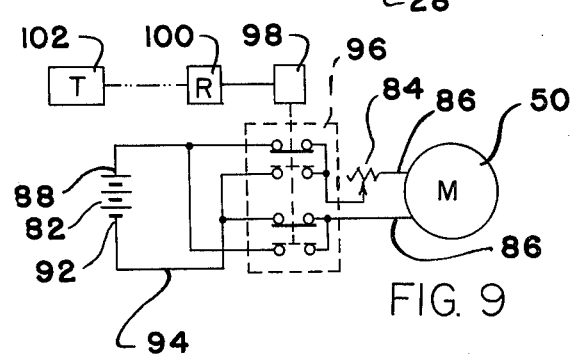
FIG. 9 is a diagrammatic view illustrating electrical circuitry employed for controlling the span trolley.

As best illustrated in FIG. 1, variable rheostat 84 is connected to motor 50 by line 86. The other side of rheostat 84 is connected to the positive terminal 88 of battery 82 by line 90 and the negative terminal 92 by line 94. As illustrated in FIG. 9, double-pole, double-throw switch 96 is connected in series to lines 90 and 94 to reverse polarity of motor 50 for reversing the direction of movement of carrier 10.

As best illustrated in FIG. 9, remote control means may be used with the carrier 10 to provide control of the carrier 10 from the ground.

A relay 98 is secured to the double-pole, double-throw switch 96 and is energized by a receiver 100, such as a subminiature receiver used in radio controlled model airplanes in a radio frequency range. A miniature transmitter 102 may be used to activate the receiver 100 to reverse the direction of motor 50 and consequently the carrier 10. The speed may be changed by manually moving rheostat 84. If deemed expedient a second channel can be added to the receiver to control the speed from the ground by a two-channel transmitter.

Means to secure a non-conductive cord 104 to carrier 10 comprise a loop 106 rigidly secured to each end of leaf spring 14 and a removeable snap hook 108 secured to cord 104.

A slight amount of tension should be retained on cord 104 to prevent excessive slack in the cord 104 but the tension should not burden the carrier 10.

Line L is often spliced by a connector S. These connectors S may be sleeves of aluminum or copper which are crimped to the ends of each line L. The connector S may have an insulating cover or be left bare. Often telephone trunk lines are bound to a steel suspension cable by binding tape. The tape comprises a vinyl binder spirally wrapped around the line L. Suspension cable often has various connectors such as a turnbuckle or shackles which would need to be traversed.

Operation of the hereinbefore described device is as follows:

The carrier 10 is detachably secured to a pre-existing suspended line L by movement of the retaining clips 40 off of spring clips 44 and movement of battery holder arm 72 upwardly allowing movement of the carrier 10 over line L.

The leaf spring 14 is deflected downwardly to allow movement of guide wheels 28 and 30 under line L and driven wheel 56 over line L. Battery holder arm 72 is then moved back to the position shown in full outline of FIG. 1 and the retainer clips 40 are moved over spring clips 44.

Factors to be evaluated at the cite of use to determine the speed of carrier 10 are the length of the span to be crossed, the number of splices or obstacles on line L which must be traversed, and other conditions such as weather. The speed is set by movement of the rheostat 84 and the device is switched on by switch 96 or remote transmitter 102. The motor 50 rotates axle 54 rotating driven wheel 56. Guide wheels 28 and 30 urge the line L upwardly to maintain frictional contact of driven wheel 56 with the upper surface of line L.

Carrier 10 moves along line L drawing the nonconductive cord 104 parallel thereto.

As best illustrated in diagrammatic FIGS. 5–8, it should be readily apparent that as the carrier 10 moves along a straight line L, the distances between the center drive wheel 56 and guide wheels 28 and 30 are equal.

Figure 6:
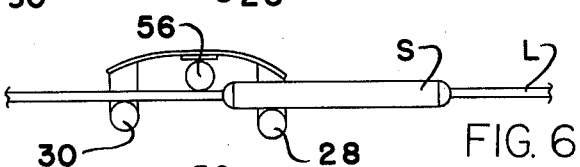

As the carrier moves onto a splice S, as illustrated in FIG. 6, the distance between the guide wheel 30 and driven wheel 56 remains unchanged, however, the distance between driven wheel 56 and guide wheel 28 is reduced as end 18 of spring 14 is moved downwardly to adapt to the larger diameter of the splice S.

Figure 7:
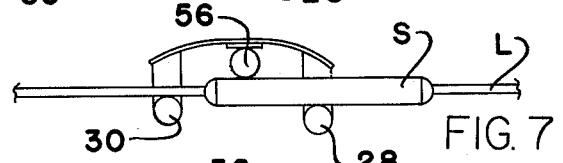
Figure 8:
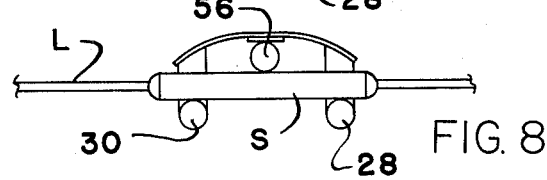

As best illustrated in FIG. 7, as the central driven wheel 56 and guide wheel 28 move over splice S the horizontal and vertical spacing between axes of the wheels is automatically adjusted to accommodate the positions of surfaces the various wheels engage.

It should be readily apparent that as the carrier 10 moves over a splice S, each wheel 28, 30 and 56 remains in frictional contact with the surface of line L or splice S, thereby preventing a situation where the driven wheel 56 might be lifted from line L which would stall the carrier 10 in the middle of the span.

As the carrier 10 reaches the end of the catenary span of line L the device is switched off either manually or with the remote control transmitter 102, if the device is so equipped.

The non-conductive cable 104 is then attached to the cable to be stretched across the two points of suspension and the cord 104 is then drawn across the two points of suspension and the cord 104 is then drawn across the two points of suspension drawing the new cable with it.

It should be readily apparent that if more than one cable is to be drawn, the device may be reversed and returned to its first point of suspension where cord 104 may be reattached and moved across the span again to draw a second cable or as many cables as needed, across the span.

It should be appreciated that the factors which control the distance which carrier 10 can transverse are the weight of the device, the size of the battery, and amperage of the motor 50 and size of line L which the carrier 10 moves over.

If it is necessary to dray heavy, non-conductive cord between the points of suspension, a first lightweight cord is preferably drawn across by the carrier 10 and attached to a heavier cord or rope which may be drawn between the suspension points. The heavier cord or rope is attached to the cable to draw the cable across the suspension points.

It should be readily apparent that the invention hereinbefore described accomplishes the objects of the invention hereinbefore discussed.

It should be appreciated that other and further embodiments in the invention may be devised without departing from the basic concept thereof.

Having described my invention, I claim:

1. A span trolley to move a cord between two points of suspension parallel to an existing line comprising: a chassis; a driven wheel; means rotatably securing the driven wheel to the chassis; means to drive the driven wheel; a pair of guide wheels; means rotatably securing the guide wheels on opposite sides of the chassis; resilient means adapted to urge the guide wheels upwardly against the line such that the line is urged against the driven wheel; means attaching a cord to the carrier such that as the driven wheel is rotated the carrier moves along the line to draw the cord from a first point of suspension of the second point of suspension of the line.

2. The combination called for in claim wherein the resilient means comprises: an elongated leaf spring positioned over the chassis.

3. The combination called for in claim 2 wherein the means to rotatably secure said guide wheels to the chassis comprises: a pair of mounting brackets; means securing the mounting brackets to each end of the leaf spring; an axle secured to each mounting bracket; and means rotatably securing each wheel to one of said axles.

4. The combination called for in claim 1 wherein the means to drive the driven wheel comprises: an electric motor; a drive axle; means securing the drive axle to the electric motor; means securing the driven wheel to the drive axle; and power means to drive the electric motor.

5. The combination called for in claim 4 wherein the power means to drive the electric motor comprises: a battery.

6. The combination called for in claim 5 with the addition of: means to vary the speed and reverse said electric motor.

7. The combination called for in claim 5 with the addition of: a switch to control the direction of said electric motor; a relay means adapted to move the switch; receiver means to actuate the relay means; and transmitter means to activate the receiver means.

8. The combination called for in claim 7 with the addition of: a rheostat connected in series with the motor and battery to vary the speed of the motor.

9. A span trolley to carry an end of a cord along a line suspended between first and second supports, the trolley comprising: a chassis; an electrically powered drive motor; means securing said drive motor to said chassis; a drive wheel having a circumferentially extending groove formed in the periphery thereof, said groove being defined by converging surfaces on the drive wheel; means drivingly connected said drive motor to said drive wheel; a battery; means securing said battery to said chassis such that the battery is suspended below the line when the chassis is supported by the drive wheel; a guide wheel; and means securing said guide wheel to the chassis such that said guide wheel is urged upwardly into engagement with a lower surface on a line when the drive wheel is in engagement with and supported by an upper surface on the line, said guide wheel and said drive wheel being movable relative to each other in a direction transversally of the line.

10. The combination called for in claim 9, said means securing said guide wheel to the chassis comprising: a resilient cantilever beam secured to said chassis, said beam having a free end spaced from said chassis; and means securing said guide wheel to the free end of the cantilever beam.

* * * * *

UNITED STATES PATENT AND TRADEMARK OFFICE
CERTIFICATE OF CORRECTION

PATENT NO. : 4,014,516
DATED : March 29, 1977
INVENTOR(S) : Kenneth R. Jacks

It is certified that error appears in the above-identified patent and that said Letters Patent are hereby corrected as shown below:

In Column 7, line 7, change "of" second occurrence to -- to --.

Signed and Sealed this

Twenty-eighth Day of June 1977

[SEAL]

Attest:

RUTH C. MASON
Attesting Officer

C. MARSHALL DANN
Commissioner of Patents and Trademarks